// United States Patent [15] 3,689,711
Earle et al. [45] Sept. 5, 1972

[54] CALL DIVERTER REPEATER

[72] Inventors: Harold Westly Earle, New Shrewsbury; Douglas Sidney Shelton, Atlantic Highlands, both of N.J.

[73] Assignee: Bell Telephone Laboratories, Incorporated, Murray Hill, N.J.

[22] Filed: Jan. 27, 1971

[21] Appl. No.: 110,021

[52] U.S. Cl. ............................179/170.6, 179/18 BE
[51] Int. Cl. ...............................................H04b 3/24
[58] Field of Search....179/170.6, 170.2, 18 BE, 16 F

[56] References Cited

UNITED STATES PATENTS

| | | | |
|---|---|---|---|
| 3,128,353 | 4/1964 | Gardner | 179/170.6 |
| 3,392,243 | 7/1968 | Skoog | 179/170.6 |
| 2,632,052 | 3/1953 | Garfield | 179/170.2 |
| 3,300,584 | 1/1967 | Jeanlin | 179/170.6 |
| 3,560,669 | 2/1971 | Foulkes | 179/170.6 |

*Primary Examiner*—Kathleen H. Claffy
*Assistant Examiner*—William A. Helvestine
*Attorney*—R. J. Guenther and Edwin B. Cave

[57] ABSTRACT

A call diverter repeater is voice-switched to provide gain in the direction from the talking party to the non-talking party and loss in the opposite direction. The gain provided is related to the value of current in the subscriber loop so that more gain is automatically provided for longer loops.

6 Claims, 3 Drawing Figures

INVENTORS H. W. EARLE
D. S. SHELTON
BY E J Olinder
ATTORNEY

CALL DIVERTER REPEATER

BACKGROUND OF THE INVENTION

1. Field of the Invention

This invention relates to apparatus for diverting telephone calls and, more particularly, to a repeater for a call diverter which provides gain to calls diverted at the station end of the subscriber loop.

2. Description of the Prior Art

Diverting of telephone calls from a called number to another number, normally previously designated by the called party, can be performed in several ways. One way is to perform such diverting function at the central office serving the called party so that the double loop losses associated with the transmissions to and from the called station are eliminated. Such call diverting or routing can be readily performed by modern telephone switching systems such as an electronic switching system. However, in many older switching systems still in widespread use, call diverting or routing cannot be readily provided at the central office but, instead, must be performed at the station end of the subscriber loop. In general, diverted calls using present call diverters provide poor transmission performance compared to nondiverted calls. Presently used call diverters normally provide no signal gain or amplification. Further, even such gain as may be provided is normally not self-adjusting for actual operating conditions such as loop currents or loop lengths in a particular case. Thus, a need remains for a call diverter for use at the station end of a subscriber loop which will provide transmission performance for diverted calls which is comparable to the transmission performance for calls diverted at the central office. Such a call diverter will require a repeater for providing gain to the transmitted signal.

Accordingly, it is an object of this invention to improve call diverters for use at the station end of subscriber loops so that the transmission performance for diverted calls is enhanced.

Another object is to improve call diverters for use at the station end of subscriber loops so that the transmission performance for calls diverted thereby is comparable to the transmission performance for calls diverted at the central office.

SUMMARY OF THE INVENTION

The foregoing objects and others are achieved in accordance with the principles of the invention by the use of a voice-switched amplifier or repeater which provides gain from the talking party to the non-talking party. The switching of the gain in response to the levels of the voice signals in the two directions provides for stability around the call diverter repeater path. The gain provided is related to the subscriber loop parameters, such as loop currents, so that more gain is provided for longer subscriber loops. Once the gain has been applied in a particular direction of transmission, signals in the opposite direction must reach a predetermined level above the signals in the particular direction before the gain direction is switched. Thus, false switching because of poor return loss is controlled.

DESCRIPTION OF THE DRAWING

The invention will be more fully comprehended from the following detailed description and accompanying drawing in which.

DETAILED DESCRIPTION

Figure 1:
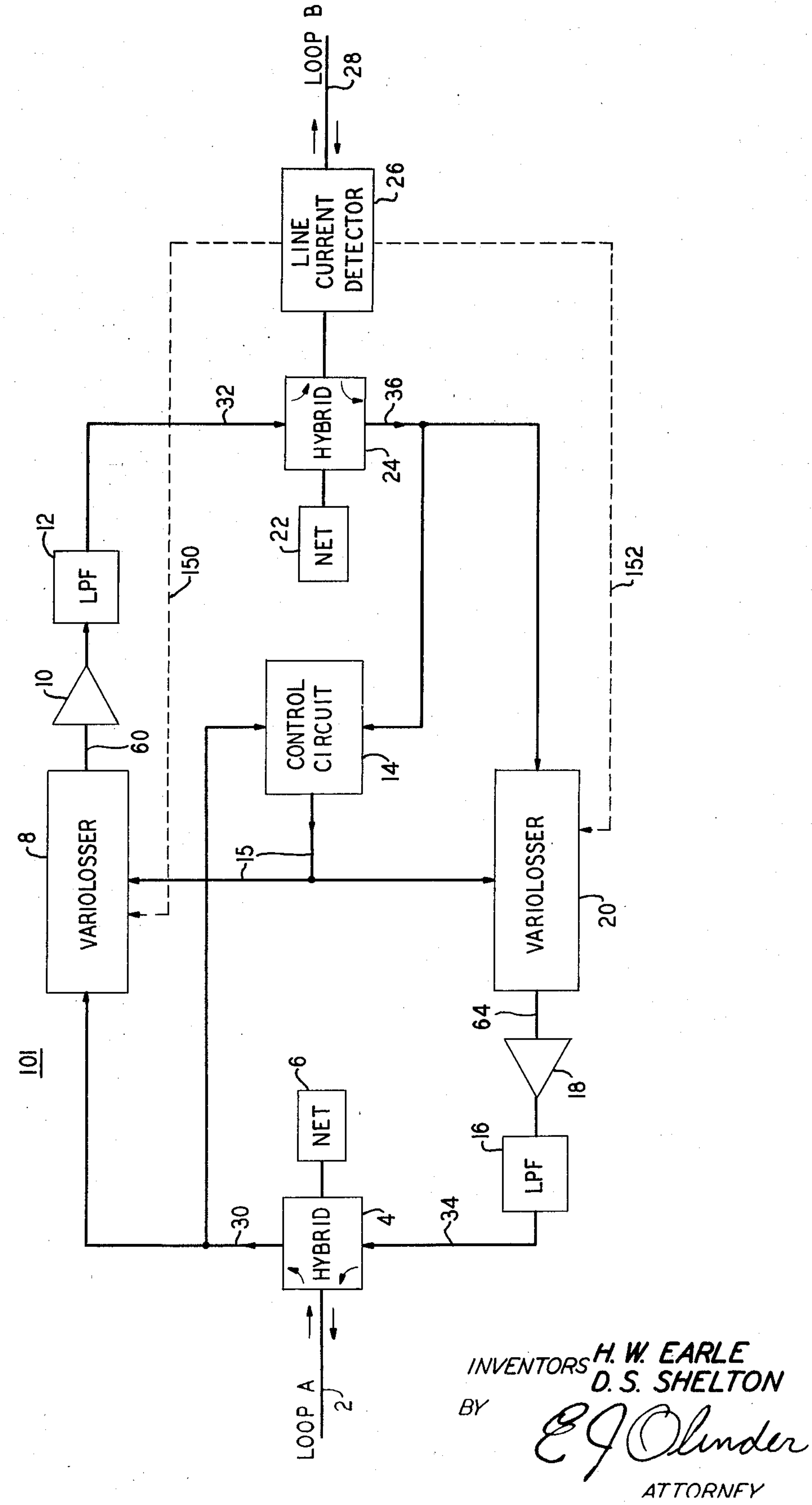
FIG. 1 is a schematic block diagram of a voice-switched repeater for use in a call diverter in accordance with the invention.

Referring now to FIG. 1, there is shown a schematic block diagram of voice-switched repeater 101 for use in an improved call diverter. Other elements of a call diverter, such as announcement circuits, means for detecting incoming calls to the subscriber station from a calling station, switching means for switching the incoming call from the called station to the designated station, and means for connecting such switching means in functional relationship with repeater 101, are known in the art and are not shown. Repeater 101 provides primarily for the improvement of the transmission performance after the incoming call has been diverted and the connection to the designated number completed.

The call diverter and hence repeater 101 is located at the subscriber station. Line 2 represents the incoming connection to the call diverter from a calling station via a subscriber loop from a central office. Line 28 represents the outgoing connection from the call diverter via another subscriber loop to the central office and thence to the designated number to which calls are being diverted. Lines 2 and 28 include separate subscriber loops, but these loops are normally provided over similar transmission facilities.

Repeater 101 is connected to and isolated from incoming line 2 and outgoing line 28 through hybrids 4 and 24, respectively, which are well known in the art. Networks 6 and 22, which are also known in the art, provide a compromise impedance match to the impedance of lines 2 and 28, respectively. The output from hybrid 4 is connected to variolosser 8 and control circuit 14 by connection 30 and the output of hybrid 24 is connected to variolosser 20 and control circuit 14 by connection 36. Connections 30 and 36, respectively, represent the path taken by signals from the calling station to the diverted station and from the diverted station to the calling station. Variolossers 8 and 20 operate in conjunction with fixed gain amplifiers 10 and 18, respectively, to insert an appropriate amount of gain into the signal being transmitted in a respective direction in response to signals from control circuit 14 and line current detector 26. Low-pass filters 12 and 16 insure stability above 3,200 Hz, where line impedance is not controlled and hence may not be effectively matched by the networks 6 and 22. Amplifiers 10 and 18 and low-pass filters 12 and 16 are devices known in the art.

In order for repeater 101 to remain stable, the gain around the repeater path, i.e., the path from hybrid 4 to hybrid 24 via variolosser 8 and then back to hybrid 4 via variolosser 20, must be less than unity. In fact, it is desirable for such gain to be as low as −10 db.

Figure 2:
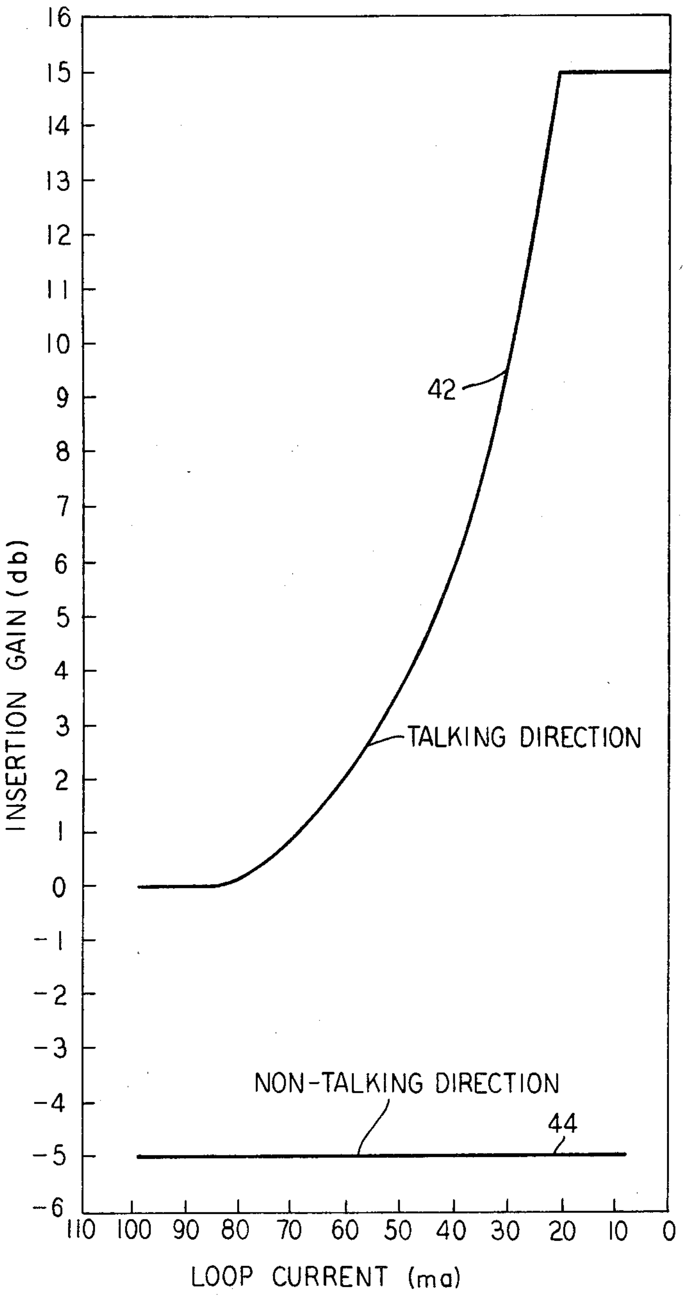
FIG. 2 is a plot of the gain inserted by the repeater versus loop currents.

The instant invention resolves the conflicting restrictions of gain and stability by providing gain in one direction of transmission and a substantial loss in the opposite direction of transmission. That is, gain is provided in the direction from the talking party to the non-talking party and a substantial loss is inserted in the opposite direction such that the total gain around the repeater path remains less than unity. The gain is switched in direction in response to the levels of the voice signals being transmitted in the two directions. FIG. 2 shows the gain which is inserted in the two directions of transmission in an illustrative embodiment of the call diverter. As shown in FIG. 2, plot 42, the actual gain inserted by repeater 101 in the direction from the talking party to the non-talking party is dependent upon the current in the subscriber line. A longer subscriber line has greater losses and less current and thus greater amplification of the transmitted signal is required to provide the same grade of service. A peak gain of approximately 15 db is inserted at the lowest expected line current value. Plot 44 shows that the gain from the non-talking party to the talking party remains essentially constant at −5 db for all values of line current. The total gain around the repeater path including the losses of hybrids 4 and 24 is less than unity and therefore the repeater is stable. The values shown for gain are illustrative only and will vary depending upon such factors as the actual losses introduced by hybrids 4 and 24.

Figure 3:
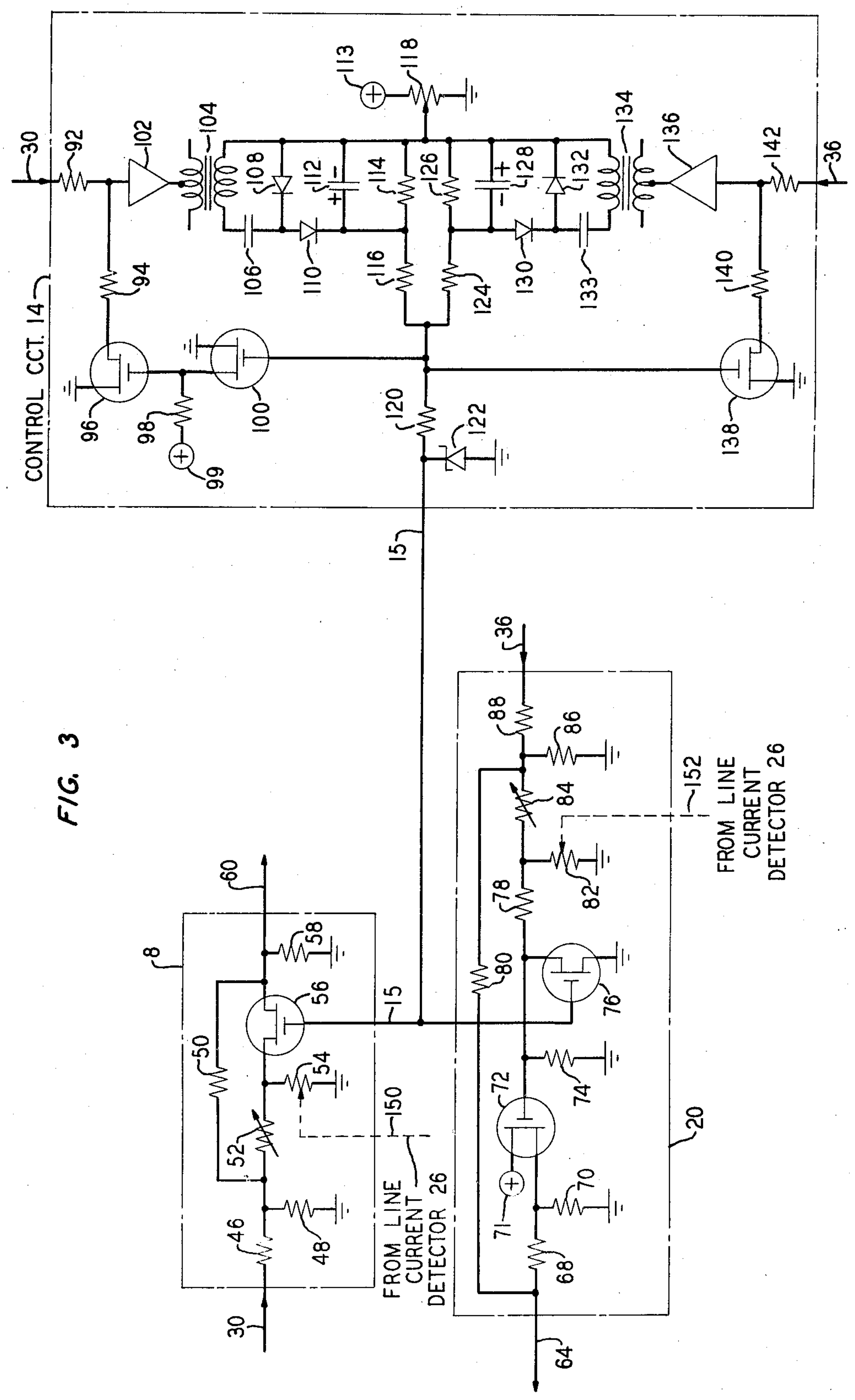
FIG. 3 is a detailed schematic diagram of the variolossers and the control circuit utilized in the voice-switched repeater of FIG. 1.

Referring now to FIG. 3, there is shown a detailed schematic of variolossers 8 and 20 and control circuit 14 from which the operation of repeater 101 can be more fully comprehended. The outputs from hybrids 4 and 24 on connections 30 and 36, respectively, shown in FIG. 1, which represent the signals from the calling station to the diverted station and from the diverted station to the calling station, are connected to control circuit 14. In control circuit 14, the signal on connection 30 is amplified by amplifier 102 and rectified by a circuit comprising transformer 104, capacitor 106 and diodes 108 and 110, which are elements known in the art. The rectified signal then charges capacitor 112 in the indicated polarity. Other elements known in the art, such as resistors 114 and 116, are placed in the charging circuit of capacitor 112 to obtain desired time constants and to limit signal levels as desired. Likewise, the signal on connection 36 is amplified by amplifier 136, rectified by a circuit comprising transformer 134, capacitor 133 and diodes 130 and 132 and used to charge capacitor 128 in the indicated polarity which is opposite to the polarity of capacitor 112. Resistors 124 and 126 are used to obtain desired time constants and to limit signal levels. Voltage source 113 and potentiometer 118 provide a standby bias level, i.e., establish the standby state for repeater 101, as will subsequently be explained.

The sum of the bias from potentiometer 118 and the voltages across capacitors 112 and 128 appears on output 15, after being limited, and the desired time constants established by such elements as resistor 120 and zener diode 122. If the signal on connection 30 is greater than that on connection 36, the voltage appearing on output 15 will be positive with respect to the standby bias established by potentiometer 118. Then element 138, which comprises an n-type enhancement field effect transistor (FET) known in the art, will be conducting and the signal from connection 36 will be attenuated some desired amount, such as 5 db, by resistors 140 and 142. This establishes the direction from the diverted station to the calling station as the non-talking direction and the signal in this direction is attenuated approximately 5 db in accordance with plot 44 of FIG. 2. Simultaneously, the direction from the calling station to the diverted station is established as the talking direction and control of repeater 101 is placed in the signal being transmitted in this direction. After the signal on connection 30 has assumed control, in order to break in and obtain control, the signal on connection 36 must reach a level which is greater than the level of the signal on connection 30 by at least the amount of attenuation introduced by resistors 140 and 142, i.e., 5 db, in the illustrative example.

Alternatively, when the signal on connection 36 has control, the voltage on output 15 is reduced below the standby bias level provided by potentiometer 118. Then element 138 and element 100, which element also comprises an n-type enhancement FET, are non-conducting while element 96, comprising another n-type enhancement FET, is conducting. Thus the signal from connection 30 is attenuated a prescribed amount, such as 5 db, by resistors 92 and 94. In order to obtain control, the signal on connection 30 must reach a level which exceeds the level of the signal on connection 36 by the amount of attenuation introduced by resistors 92 and 94. Element 100 obtains operating power from source 99 through resistor 98.

The signal on output 15 of control circuit 14 is connected to the gate electrodes of elements 56 and 76, which comprise matched n-type enhancement FETS in variolossers 8 and 20, respectively. As previously stated, variolossers 8 and 20 respond to the signals from control circuit 14 and line current detector 26 and operate in conjunction with amplifiers 10 and 18, respectively, to control the amount of gain inserted into the signals on connections 30 and 36.

Each of variolossers 8 and 20 comprises basically three attenuators. The first attenuator in each variolosser serves to terminate hybrids 4 and 24, respectively, in an appropriate impedance and to reduce distortion products generated when elements 56 and 76, respectively, are biased in the linear regions. This first attenuator comprises resistors 46 and 48 and resistors 86 and 88, respectively, in variolossers 8 and 20. In an illustrative embodiment the attenuation introduced by this first attenuator is approximately 13 db.

The second attenuator in each of variolossers 8 and 20 introduces a relatively fixed attenuation whenever the signal on either connection 30 or 36, respectively, is smaller than the signal on the other connection. For example, when the signal on connection 30 is smaller than that on connection 36, signifying that the controlling signal is on connection 36 and that the talking to non-talking direction is from the diverted station to the calling station, the second attenuator in variolosser 8 introduces a substantially fixed loss to the signal on connection 30. In an illustrative embodiment such loss is approximately 20 db. Alternatively, if the signal on connection 30 is greater, the second attenuator in variolosser 20 introduces a fixed loss of approximately 20 db into the signal on connection 36. The second attenuator comprises resistors 50 and 58 and resistors 68 and 80 in variolossers 8 and 20, respectively.

The third attenuator in each of variolossers 8 and 20 introduces a variable amount of attenuation, depending upon the value of current in the subscriber line as measured by line current detector 26, into the signal having control of repeater 101. The third attenuator in one variolosser operates simultaneously with the second attenuator in the other variolosser. For example, when the signal on connection 30 is in control, the third attenuator in variolosser 8 introduces a variable amount of attenuation into such signal, while simultaneously, the second attenuator in variolosser 20 introduces a fixed amount of attenuation into the signal on connection 36 as previously discussed. In an illustrative embodiment, the attenuation of the third attenuator ranges from zero to 15 db along a curve substantially like plot 42 of FIG 2. The third attenuator comprises variable resistors 52 and 54 and variable resistors 82 and 84 in variolossers 8 and 20, respectively.

Resistors 54 and 82 in variolossers 8 and 20, respectively, respond to signals from line current detector 26 to vary the attenuation of the signals being transmitted. Detector 26 advantageously can comprise a light emitting diode (LED) circuit which is responsive to line current value. Variable resistors 54 and 82 are then optically coupled to the light emitting diode as illustrated by couplings 150 and 152, respectively. Resistors 54 and 82 advantageously can comprise cadmium sulphide photoresistors or similar light sensitive resistors known in the art. Other means, such as the use of thermally sensitive circuits, will be apparent to those skilled in the art for obtaining variable resistors 54 and 82 which are responsive to the value of line current as measured by detector 26.

As will now be more fully explained, variolossers 8 and 20 operate in conjunction with fixed gain amplifiers 10 and 18, respectively, to determine the gain inserted into the transmitted signals in accordance with FIG. 2. Elements 56 and 76 in variolossers 8 and 20, respectively, are turned on or conducting when the voltage appearing on the output 15 of control circuit 14 is greater than the bias provided by potentiometer 118, which signifies that the signal on connection 30 is larger than that on connection 36. Resistor 50 in the second attenuator of variolosser 8 is relatively large compared to the drain-source impedance of conducting element 56 and thus this second attenuator can be neglected. The losses introduced into the signal on connection 30 are then determined by attenuator 1, which is fixed and always operable, and by attenuator 3. The attenuation of attenuator 3 depends upon the initial setting of variable resistor 52. After the initial setting, the attenuation is controlled by the value of line current which causes variable resistor 54 to vary in response thereto as previously described. Thus, the combination of variolosser 8 and amplifier 10 operates so that the gain inserted into the signal being transmitted varies with line current in accordance with plot 42.

When element 76 is conducting, the loss in variolosser 20 is determined by the first and second attenuators thereof, both of which are substantially fixed. Resistor 78 is relatively large and the drain-source impedance of conducting element 76 very low so that the signal path through the gate electrode of element 72 can be neglected in determining the attenuation of variolosser 20. The attenuation of the second attenuator is then determined by the path through resistors 80, 68, and element 72, which element comprises an n-type depletion FET connected as a source follower and having a low output impedance. Resistor 74 is very large and can be neglected in comparison with the drain-source impedance of conducting element 76. Resistor 70 is also sufficiently large to be neglected in comparison with the low output impedance of conducting element 72. Thus, variolosser 20 operates in conjunction with fixed gain amplifier 18 so that the total gain inserted into the signal on connection 36 remains at a constant low value in accordance with plot 44 of FIG. 2. Element 72 derives operating power from source 71.

When the voltage on output 15 is negative with respect to bias established by potentiometer 118, signifying that the signal on connection 36 has control, elements 56 and 76 are nonconducting. When element 56 is nonconducting, its drain-source impedance is very high compared to the resistance value of element 50, so that transmission through the third attenuator (elements 52 and 54) and through element 56 can thus be neglected with respect to the transmission through the second attenuator comprising resistors 50 and 58. The total attenuation of variolosser 8 is then determined primarily by the first and second attenuators which remain substantially fixed. Variolosser 8 then works in conjunction with amplifier 10 to introduce a low gain into the signal being transmitted on connection 30 in accordance with plot 44 of FIG. 2. Simultaneously in variolosser 20, the drain-source impedance of element 76 becomes very large and this element can be neglected as a signal path to ground. The values of resistor 74 and the input impedance of element 72 are also large such that these elements attenuate the signal through 78 from connection 36 only slightly. The attenuation provided by variable resistors 82 and 84, fluctuates in response to the value of line current. Thus variolosser 20 and amplifier 18 operate to provide an overall gain to the signal which is related to line current according to plot 42.

It is apparent from the foregoing description of operation that the signal from the talker to the nontalker will be amplified in response to the value of line current. The direction in which the gain is applied is determined by the levels of the signals in the two directions of transmission. In order to change the direction of application of the gain, the signal from the nontalker to the talker must become larger than the signal in the opposite direction by approximately 5 db in the illustrative embodiment. This insures that no false switching occurs because of poor return loss in the telephone system. The overall gain around the repeater path remains less than unity because of the feature of switching gain direction so that the repeater remains stable during operation.

While the invention has been described with respect to a specific embodiment thereof, it is to be understood that various modifications thereto might be made by those skilled in the art without departing from the spirit and scope of the foregoing description and following claims.

What is claimed is:

1. An improved call diverter of the type for use at the subscriber station end of a telephone loop and including means for detecting an incoming call from a calling station to said subscriber station, means for diverting said call to another previously designated station so that a two-way telephone communications path is established between said designated station and said calling station, and a repeater for providing gain to improve transmission performance for said call, characterized in that said repeater includes:

first and second amplifiers and first and second attenuator circuits, respectively, connected in first and second directions of said two-way path, each of said attenuator circuits including a multiple of attenuators comprising a first attenuator having a substantially fixed value, a second attenuator having a substantially fixed value, a third attenuator having a value proportional to the value of current in said telephone loop, and switch means for selectively applying said attenuators in said respective directions; and a control circuit responsive to the relative levels of signals in said respective directions of said two-way path to control said switch means so that said first attenuator is applied in said respective direction at all times to reduce unwanted distortion signals generated by said switch means, said second attenuator is applied in said respective direction when said signal in said respective direction has a level smaller than said signal in the other of said first and second directions, and said third attenuator is applied in said respective direction when said signal in said respective direction has a level greater than said signal in said other direction whereby said repeater remains stable while improving the quality of said signals.

2. Apparatus in accordance with claim 1 wherein said control circuit includes:

first and second means for rectifying said signals in said respective directions;

first and second capacitors each responsive to respective rectifying means for generating outputs related to said levels of said respective signals;

means for combining said outputs to obtain a control signal for controlling said switch means, said control signal having a polarity with reference to a bias voltage dependent upon the relative levels of said outputs; and means for attenuating the one of said signals initially having the smaller level by a prescribed amount so that said control signal changes polarity with reference to said bias voltage only when said one signal initially having said smaller level becomes greater than the other one of said signals by an amount exceeding said prescribed amount.

3. An improved call diverter of the type for use at the subscriber station end of a telephone loop and including means for detecting an incoming signal from a calling station to said subscriber station, means for diverting said call to another previously designated station so that a two-way telephone communications path is established between said designated station and said calling station, and a repeater for providing gain to improve the transmission performance for said call, characterized in that said repeater includes:

first and second amplifier means respectively connected in first and second directions of said two-way path; and a control circuit for comparing the relative level of signals in said first and second directions and producing a control signal in accordance therewith for controlling the gain and loss applied to signals in respective directions by said first and second amplifier means, said control circuit including:

first and second means for rectifying said signals in said respective directions;

first and second capacitors each responsive to a respective rectifying means for generating an output related to said levels of said respective signals;

means for combining said outputs to obtain said control signal, said control signal having a polarity with reference to a bias voltage dependent upon the relative levels of said outputs; and means for attenuating the one of said signals initially having the smaller level by a prescribed amount so that said control signal changes polarity with reference to said bias voltage only when said one signal initially having said smaller level becomes greater than the other one of said signals by an amount exceeding said prescribed amount.

4. A repeater for use in a communications system having a two-way signaling path comprising, in combination:

first and second amplifiers and first and second attenuator circuits, respectively, connected in first and second directions of said two-way path, each of said attenuator circuits including a multiple of attenuators comprising a first attenuator having a substantially fixed value, a second attenuator having a substantially fixed value, a third attenuator having a value proportional to the value of current in said signaling path, and switch means for selectively applying said attenuators in said respective directions; and a control circuit responsive to the relative levels of signals in said respective directions of said two-way path to control said switch means so that said first attenuator is applied in said respective direction at all times to reduce unwanted distortion signals generated by said switch means, said second attenuator is applied in said respective direction when said signal in said respective direction has a level smaller than said signal in the other of said first and second directions, and said third attenuator is applied in said respective direction when said signal in said respective direction has a level greater than said signal in said other direction whereby said repeater remains stable while improving the quality of said signals.

5. Apparatus in accordance with claim 4 including:

first and second means for rectifying said signals in said respective directions;

first and second capacitors each responsive to respective rectifying means for generating outputs related to said levels of said respective signals;

means for combining said outputs to obtain a control signal for controlling said switch means, said control signal having a polarity with reference to a bias voltage dependent upon the relative levels of said outputs; and means for attenuating the one of said signal initially having the smaller level by a prescribed amount so that said control signal changes polarity with reference to said bias voltage only when said one signal initially having said smaller level becomes greater than the other one of said signals by an amount exceeding said prescribed amount.

6. A repeater for use in a communications system having a two-way signaling path comprising, in combination:

first and second amplifier means respectively connected in first and second directions of said two-way path; and a control circuit for comparing the relative level of signals in said first and second directions and producing a control signal in accordance therewith for controlling the gain and loss applied to signals in respective directions by said first and second amplifier means, said control circuit including:

first and second means for rectifying said signals in said respective directions;

first and second capacitors each responsive to a respective rectifying means for generating an output related to said levels of said respective signals;

means for combining said outputs to obtain said control signal, said control signal having a polarity with reference to a bias voltage dependent upon the relative levels of said outputs; and means for attenuating the one of said signals initially having the smaller level by a prescribed amount so that said control signal changes polarity with reference to said bias voltage only when said one signal initially having said smaller level becomes greater than the other one of said signals by an amount exceeding said prescribed amount.

* * * * *